(12) United States Patent
Tsai et al.

(10) Patent No.: US 6,190,015 B1
(45) Date of Patent: Feb. 20, 2001

(54) LIQUID CRYSTAL DISPLAY PROJECTOR WITH A LENS SHADING DEVICE CAPABLE SHADING AND POSITIONING LENS

(75) Inventors: Willy Tsai, Chu-Pei; Ho Lu, Pao-Shan Hsiang, both of (TW)

(73) Assignee: Mustek Systems, Inc., Hsinchu (TW)

( * ) Notice: Under 35 U.S.C. 154(b), the term of this patent shall be extended for 0 days.

(21) Appl. No.: 09/368,520

(22) Filed: Aug. 5, 1999

(51) Int. Cl.$^7$ .................................................. G03B 21/14
(52) U.S. Cl. ............................................ 353/101; 353/119
(58) Field of Search ................................. 353/119, 101, 353/100, DIG. 3, DIG. 6

(56) References Cited

U.S. PATENT DOCUMENTS

| | | | |
|---|---|---|---|
| 4,968,134 | * 11/1990 | Shimizu et al. | 353/119 |
| 5,321,450 | * 6/1994 | Shapiro et al. | 353/119 |
| 5,639,152 | * 6/1997 | Nelson | 353/119 |
| 5,642,927 | * 7/1997 | Booth et al. | 353/101 |
| 5,669,688 | * 9/1997 | Baar et al. | 353/119 |

\* cited by examiner

*Primary Examiner*—William Dowling
(74) *Attorney, Agent, or Firm*—Bacon & Thomas

(57) ABSTRACT

The invention relates to a liquid crystal display projector with a lens protecting device capable of protecting and positioning lens of liquid crystal display projector. The lens protecting device of the invention comprises a cover, a top housing, a bottom housing, an actuating device, a plurality of springs and a mirror, where the lens is secured in the top housing and the actuating device also is connected to the top housing. Moreover, the mirror is located in the cover, and the top housing and the bottom housing are connected to each other by said springs. Further, the cover can be connected to the top housing or the projector with at least one hinge and projection of the projector is adjusted by only rotating the cover around the hinge. When the top housing is gradually covered by the cover, the actuating device will touch the top housing and deform these springs such that the top housing is located into the LCD projector and the lens is located in the protecting position. Therefore, When the LCD projector does not be operated, the lens is covered by the cover and disadvantages such as dirty and scare are properly protected. On the other hand, when the LCD projector is operating, lens is positioned to the projecting position by these springs.

26 Claims, 4 Drawing Sheets

LIQUID CRYSTAL DISPLAY PROJECTOR WITH A LENS SHADING DEVICE CAPABLE SHADING AND POSITIONING LENS

BACKGROUND OF THE INVENTION

1. Field of the Invention

The present invention relates to a liquid crystal display (LCD) projector with a lens protecting device capable of protecting and positioning lens. In addition, particularly to a lens-protecting device that not only properly positions the lens in a projecting location when the LCD projector is operating but also efficiently protects the lens when the lens is shaded.

2. Description of the Prior Art

For liquid crystal display (LCD) projector, it is necessary to adjust focal length of LCD projector by lens. There are two categories of configuration of LCD projector:

First category, light from liquid crystal panel directly propagates through lens onto screen.

Second category, both lens and mirror are used to adjust focal length and change propagating direction of light.

No matter how, both categories having some unavoidable advantages. For the first category, it is impossible to adjust projecting direction/angle of LCD projector without rotating LCD projector, and it is not convenient for user. For the second category, though projecting direction/angle of LCD projector can be changed without rotating LCD projector, but popular configurations of the category not only are complicated and non-impact, but also is not convenient for user to adjust locations of both lens and mirror. Moreover, owing to the fact that for popular configuration of LCD projector both mirror and lens are not properly protected when LCD projector does not operate, the risk that both lens and mirror are dirty and scared is increased.

Therefore, it is desired to develop a lens protecting device capable of protecting both lens and mirror when LCD projector does not operate. Beside, it also is important for the lens protecting device that properly place both lens and mirrors in proper locations such that LCD projector can properly operate.

SUMMARY OF THE INVENTION

It is the main objective of the present invention to mitigate and/or obviate these previously described disadvantages in the manner set forth in the following description of these preferred embodiments.

A primary object of the present invention is to provide a lens protecting device for a LCD projector which protect lens with a cover, a top housing, a bottom housing, an actuating device, a mirror and several springs. Where bottom housing is connected to the LCD projector and the mirror is fixed in the cover. Moreover, top housing and bottom housing are connected by a plurality of springs and the lens is secured in the top housing.

Another objective of the present invention is to provide a lens protecting device which change projecting direction/angle of LCD projector without rotating the LCD projector. Moreover, when the LCD projector is operating then the lens is properly positioned in a projecting location, and when the lens is shaded the lens is efficiently protected.

The mechanism of the provided invention can briefly illustrated by two following description.

First, the distance between both housing is adjustable by these springs and is adjusted to change location of lens such that lens is proper protected inside the LCD projector when LCD projector does not operate and is located in a proper position to propagate light when LCD projector is operating.

Second, because propagating direction/angle of light is changed by the mirror when light propagates through lens, the invention provides a convenient method to adjust projecting direction of LCD projector.

Third, because cover properly covers the top housing and lens, lens is protected by the cover when the LCD projector does not operate and then some convenient disadvantages such as dirty and scrape are protected.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
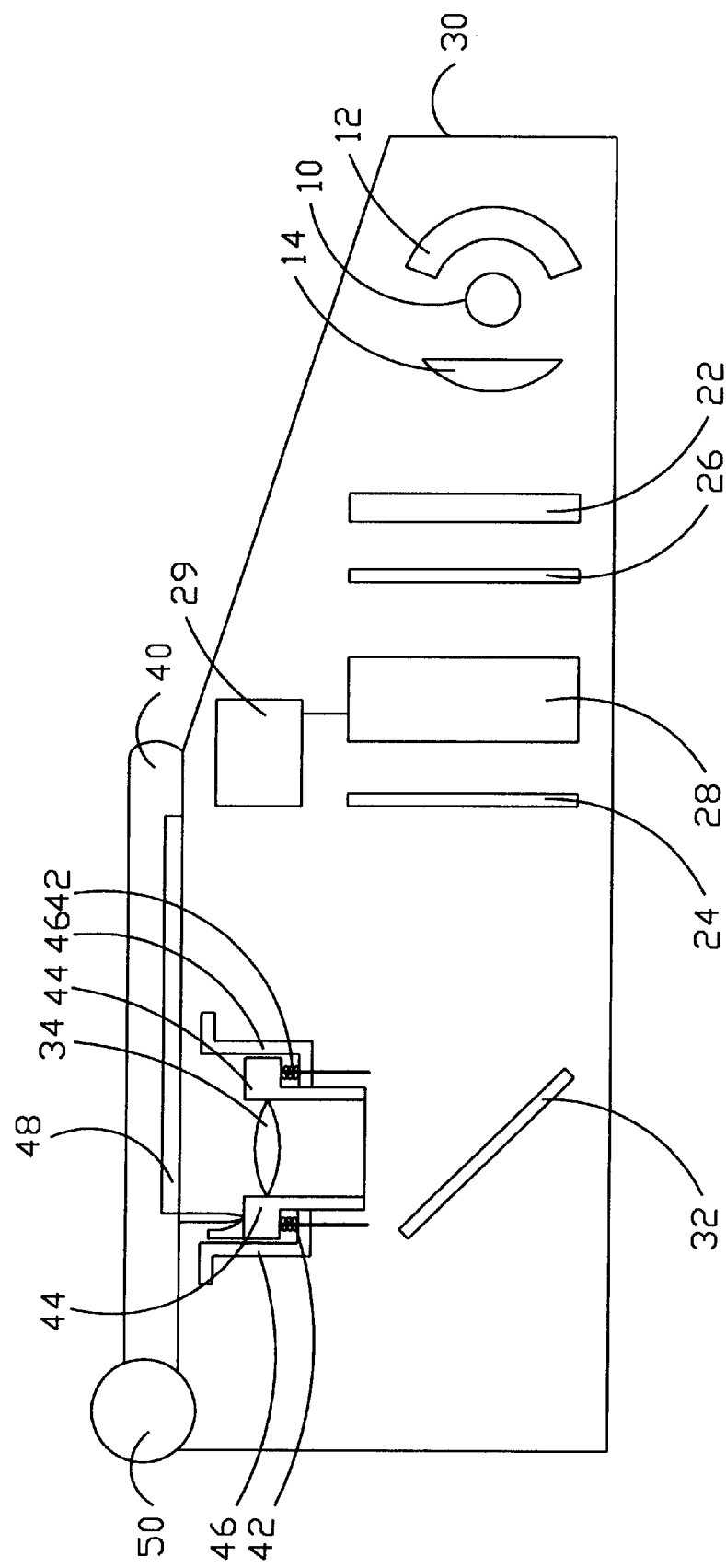
FIG. 1 briefly illustrates configuration of a liquid crystal display projector with a lens protecting device according to one embodiment of the present invention, where lens is placed in a protecting location.
Figure 2:
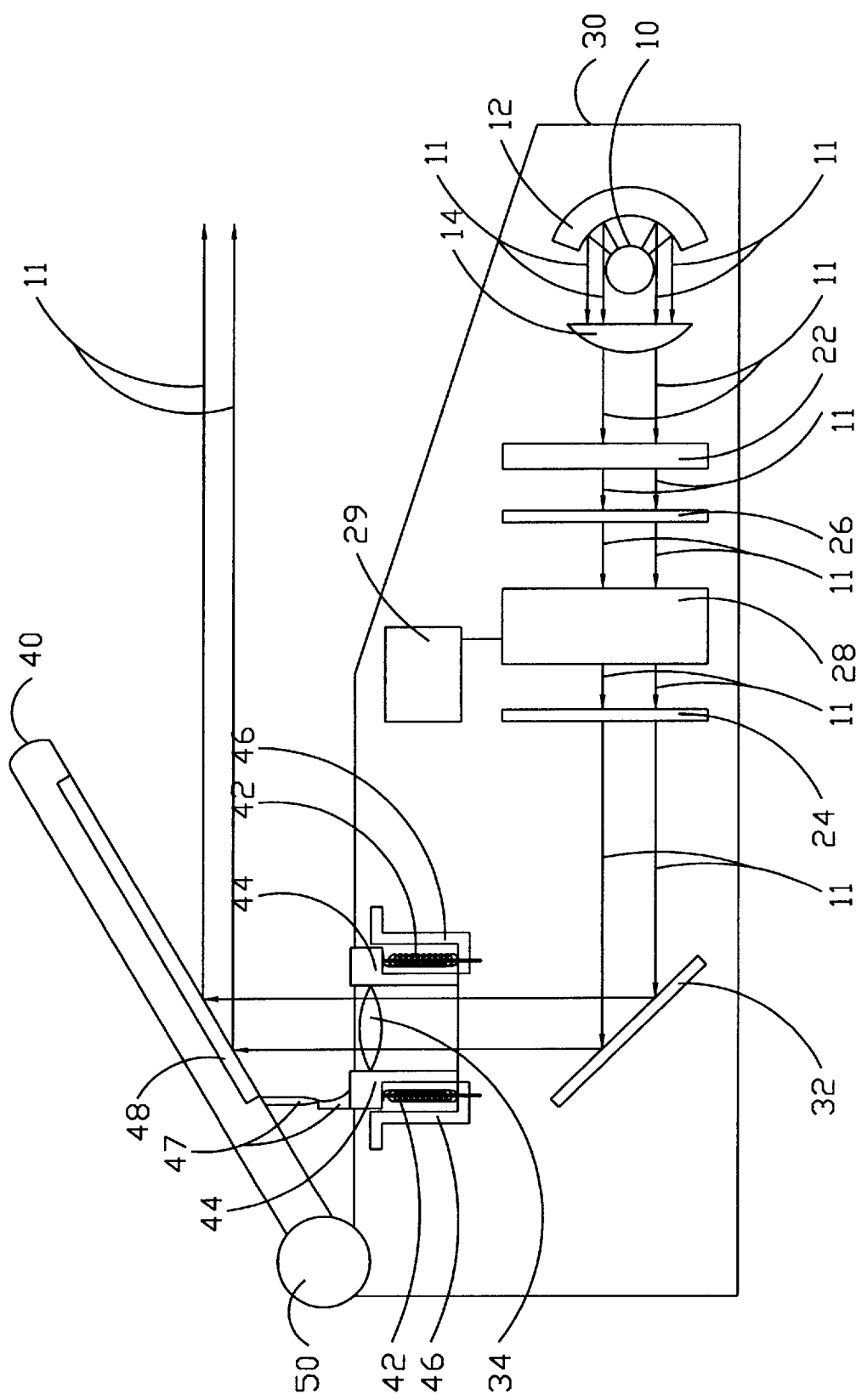
FIG. 2 briefly illustrates configuration of a liquid crystal display projector with a lens protecting device according to one embodiment of the present invention, where lens is placed in a projecting location.

The first embodiment of the present invention is illustrated in following paragraphs, the embodiment illustrates a liquid crystal display projector with a lens protecting device capable of protecting and positioning lens. Referring to FIG. 1 and FIG. 2, the proposed liquid crystal display projector comprises following assemblies: a light source assembly, an image generating assembly, a power supply assembly, a boxing assembly, a projection assembly and a lens protecting device assembly. The proposed liquid crystal display projector further comprises a heat cooling assembly. Moreover, the lens protecting device assembly is the essential point of the invention.

Light source assembly is used to produce required light 11 for operation of liquid crystal display projector, the light source assembly comprises light source 10, reflector 12 and condenser 14. Light source 10 generates light 11 for operation of the liquid crystal display projector, reflector 12 and condenser 14 enhance intensity of light 11.

The function of image generating assembly is to generate a projected image, the image generating assembly comprises rear fresnel lens 22, front fresnel lens 24, polarizer 26, liquid crystal panel 28 and liquid crystal panel controller 29. Moreover, rear fresnel lens 22 locates in a side of image generating assembly that nearer to the light source assembly and front fresnel lens 24 locates in another side of the image generating assembly. Both front fresnel lens 24 and rear fresnel lens 22 are used to guide propagation of light 11. In addition, liquid crystal panel controller 29 accepts signal from an external machine and controls operation of liquid crystal panel 28. Where the external machine comprises computer and then the projector can translate any external signals of external machine to projected images.

Power supply assembly provides required power for any assembly of the liquid crystal display projector.

Boxing assembly is used to boxing assembly a plurality of assemblies of present liquid crystal display projector.

The function of projection assembly is projecting any projected image that generated by image generating onto a screen or a wall. Where projection assembly comprises first mirror 32 and lens 34, first mirror 32 locates inside boxing assembly 30 and is used to change propagating direction of light, lens 34 are used to adjust focal length of liquid crystal display projector.

Heat cooling assembly is used to decrease temperature of image generating assembly to insure the image generating assembly can properly operate Lens protecting device assembly is used to protect and position lens 34. Lens protecting device assembly comprises cover 40, a plurality of springs 42, top housing 44, bottom housing 46, actuating device 47 and second mirror 48. Moreover, lens protecting device assembly is used to let lens 34 moves between a protecting location and a projecting location, and actuating device 47 is connected to cover 40.

Because the lens protecting device assembly is the essential point of the invention, it is explained in great detail by following paragraphs.

First, lens protecting device assembly is expansible and is used to protect lens 34 in the protecting location when the LCD projector does not operate and position lens 34 in the projecting location when the LCD projector is operating.

Second, cover 40 can be connected with boxing assembly 30 or with bottom housing 36 by hinge 50 and actuating device 47, where FIG. 1 and FIG. 2 only illustrate the case that cover 40 connects to boxing assembly 30. The only restriction is that when the LCD projector does not operate then cover 40 must totally cover top housing 44 and lens 34, and when the LCD projector is operating then cover 40 can be lifted to let lens 34 is placed in the projecting location. Herein, actuating device 47 is used to translate the movement of cover 40 to top housing 44. Therefore, top housing 44 and lens 34 both can be pushed into boxing assembly 30 when the LCD projector does not operate, and when the LCD projector is operating, actuating device 47 is fixed and then degree of an angle that between top housing 44 and cover 40 can also be fixed. Moreover, the degree of an angle that between top housing 44 and cover 40 is adjusted to change a projecting angle of the liquid crystal display projector by second mirror 48. In addition, range of the degree of angle is decided by required quality of the LCD projector and a typical range of angle is about from about 0 to about 53°.

Third, lens 34 is secured in top housing 44 and moves together with top housing 44. Furthermore, bottom of top housing 44 is transparent to let light transport through top housing 44 and lens 34. Of course, bottom of bottom housing 46 also is transparent to let light transport through without any obstruction.

Fourth, bottom housing 46 is totally secured inside boxing assembly 30, and connects with top housing 44 by springs 42. Where one end of each of springs 42 is secured in top housing 44 and another end of each of springs 42 is secured in bottom housing 46. Therefore, it is obvious that top housing 44 does not secured inside boxing assembly 30 and location of top housing 44 is adjustable.

Fifth, when cover 40 does not cover top housing 44 then these springs 42 push lens 34 and top housing 44 away from bottom housing 46, and locates lens in the projecting location, as shown in FIG. 2. On the other hand, when top housing 44 rotating around hinge 50 and is closed to top housing 44, actuating device 47 will contacts and pushes top housing 44 and then these springs 42 will be deformed. Therefore, both top housing 44 and lens 34 are pushed gradually into boxing assembly 30 and is gradually closed to bottom housing 46, until both top housing 44 and lens 34 are located inside box assembly 30 and lens 34 is located in the protecting position, as shown in FIG. 1. Moreover, the distance between the protecting location and the protecting position depends on the optical quality of the LCD projector and is controlled by both friction of hinge 50 and elasticity of springs 42.

It should be noted that though in these figures of the embodiment, springs 42 are compressed when top housing 44 is covered by cover 40, the proposed invention does not be restricted by the relation. In addition, though in the embodiment both actuating device 47 and top housing 44 are used to deform springs 42 by movement of cover 40, and actuating device 47 is a movable joggle joint. The invention does not is restricted by the relation, any method which can connect cover 40 and springs 42 can be used by the proposed method.

According to previous discussion, it is obvious that when the LCD projector does not operate then lens 34 is located inside boxing assembly 30 and is covered by cover 40. Therefore, lens 34 is protected by cover 40 and conventional disadvantages such as lens is dirty and lens is scared can be efficiently avoid. Moreover, when the LCD projector does not operate, both lens 34 and second mirror 48 are located inside boxing assembly 30. Therefore, shape of the LCD projector can be simplified by the proposed invention and a compact structure of the LCD projector can be formed.

On the other hand, when the LCD projector is operating, it is possible to directly and exactly position lens 34 in the projection location by properly modulating friction of hinge 50 and elasticity of springs 42. Therefore, only projecting direction/angle of the LCD projector is required to be adjusted and it is easy to archive by only lifting cover 40. Thus, the invention provides a convenient operating method for user.

Figure 3:
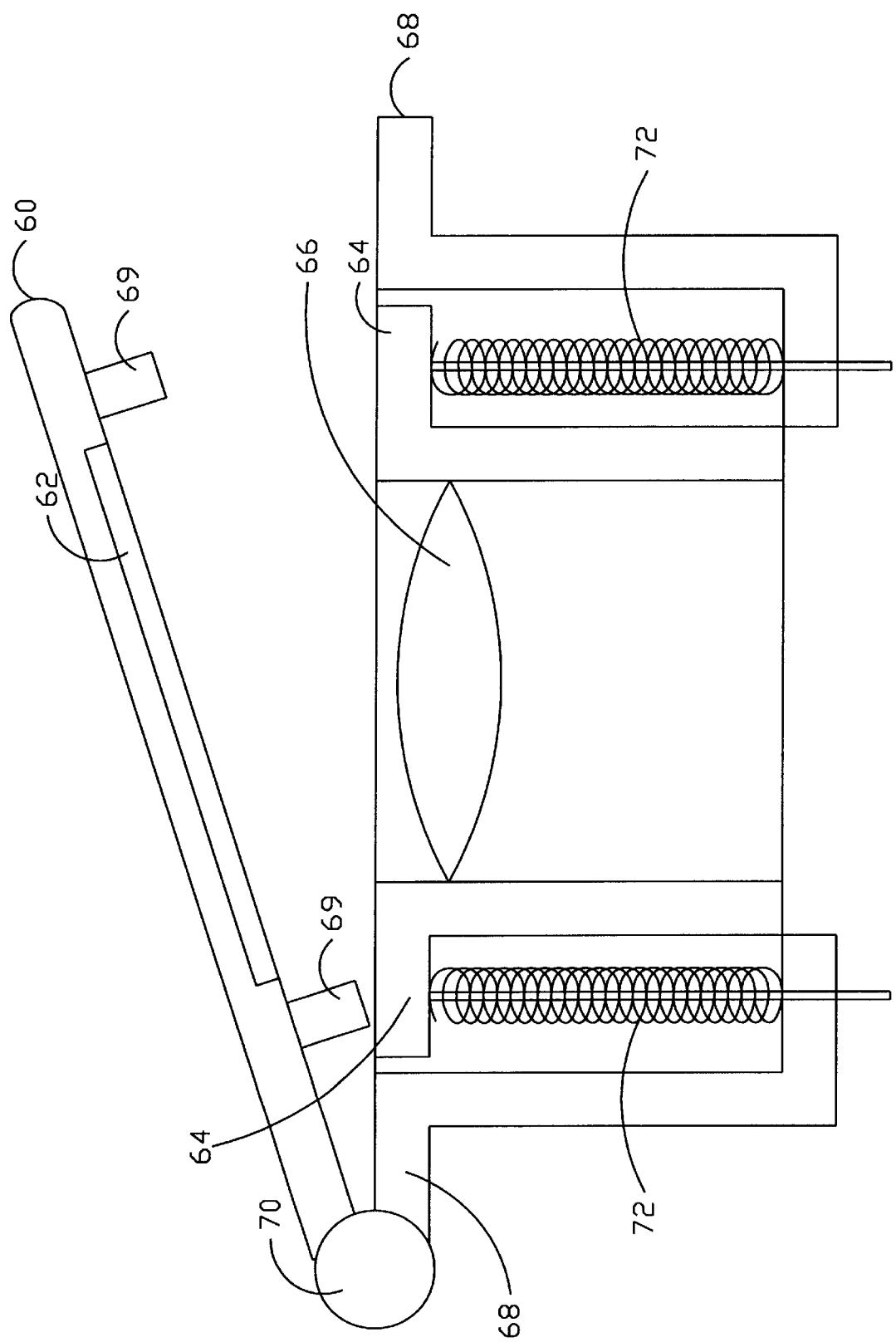
FIG. 3 is a briefly illustration about configuration of a lens protecting device according to another embodiment of the present invention, where lens is placed in a projecting location.
Figure 4:
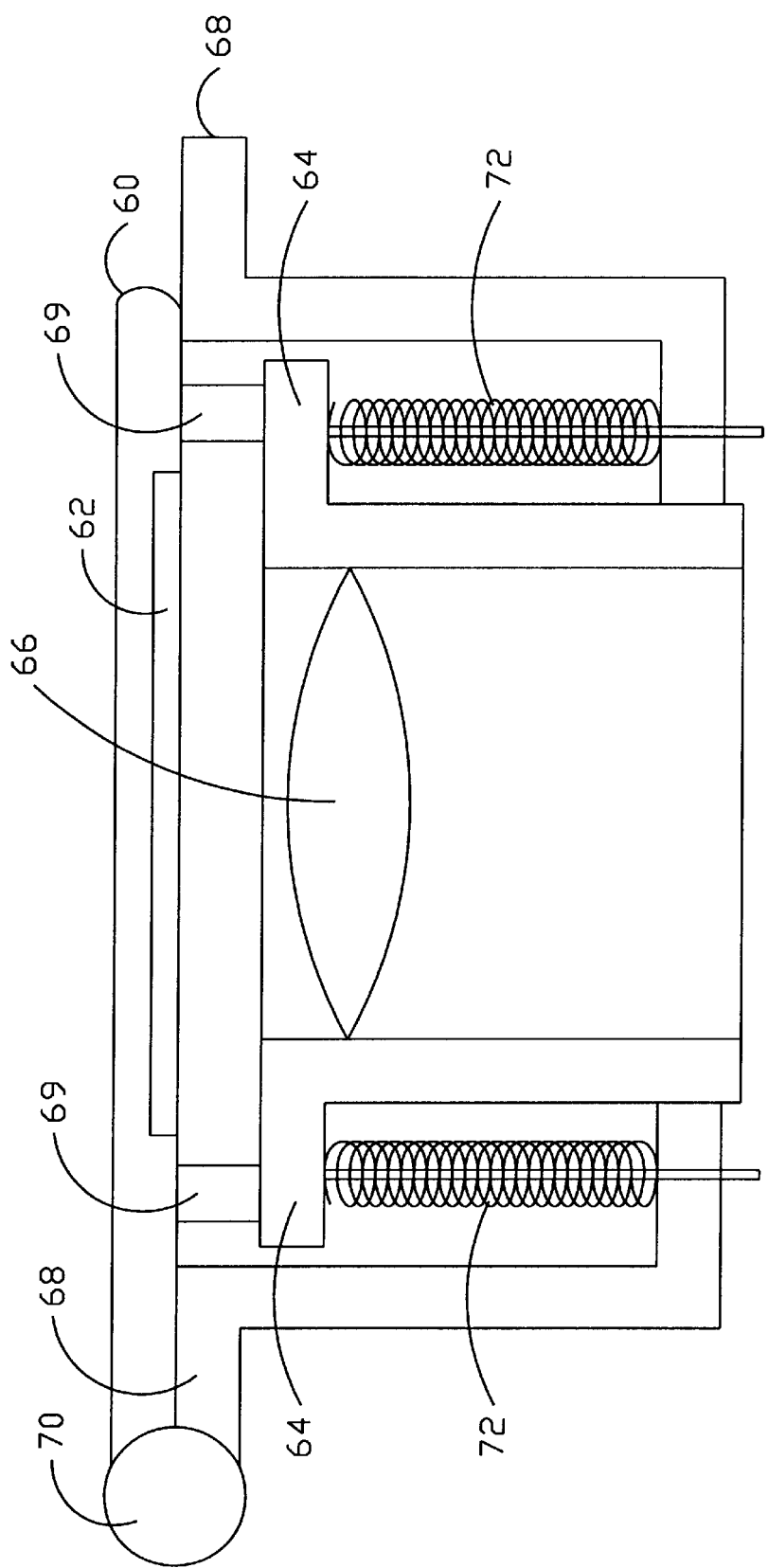
FIG. 4 is a briefly illustration about configuration of a lens protecting device according to another embodiment of the present invention, where lens is placed in a protecting location.

Another embodiment of the present invention is a lens protecting device capable of protecting and positioning lens of liquid crystal display projector. Referring to FIG. 3 and FIG. 4, the provide lens protecting device comprises: cover 60 with mirror 62 locates on cover 60, top housing 64 that is used to secure lens 66 and moves together with lens 66, bottom housing 68 that connects with cover 60 by hinge 70, actuating device 69 which is connected to cover 60 and is used to change position of top housing 64, and a plurality of springs 72 that connect top housing 64 and bottom housing 68. Herein, lens 66 is used to adjust propagation of light and is an optical part of the liquid crystal display projector.

Obviously, the configuration is similar to the lens protecting device assembly of previous invention. Thus, the lens protecting device has following characteristics that are similar to the previous embodiment:

(1) The lens protecting device is expansible and is used to protect and position lens 66.

(2) Cover 60 and mirror 62 are used to change projecting angle of the liquid crystal display projector.

(3) Degree of an angle between top housing 64 and cover 60 is adjustable, and degree of the angle is proportional to projecting angle of the liquid crystal display projector.

(4) Both bottom of top housing 64 and bottom of bottom housing 68 are transparent to let light transport through these housing and lens 66 without any obstruction.

(5) Bottom housing 68 is totally secured inside the liquid crystal display projector, and top housing 64 is connected with bottom housing 68 by springs 72.

(6) One end of each of springs 72 is secured in top housing 64 and another end of each of springs 72 is secured in bottom housing 68. Therefore, because springs 72 are compressible then location of top housing 64 is adjustable.

(7) When cover 60 does not cover top housing 64, top housing 64 with lens 66 is pushed away bottom housing 68 by springs 72 and is placed in a projecting location, as FIG. 3 shows. When the LCD projector does not is operated, top housing 64 is gradually covered by cover 60 which rotates around hinge 70. Obviously, when rotating degree is enough large actuating device 69 will contact and push top housing 64, and then springs 72 are deformed. Therefore, when top housing 64 is totally covered by cover 60, then both top housing 64 and lens 66 are totally located into the LCD projector by actuating device 69. Thus, lens 66 is placed in a protecting location, as FIG. 4 shows.

(8) The distance between the protecting location and the protecting position depends on optical requirement of the LCD projector, and is adjusted by some factors such as friction of hinge 70 and elasticity of springs 72.

According to the fact that configuration of the embodiment is similar to configuration of the lens protecting device assembly of the previous embodiment, the mechanism also is similar to configuration of the lens protecting device assembly of the previous embodiment and does not repeated illustrate.

As various possible embodiments may be made of the above invention without departing from the scope of the invention, it is to be understood that all matter herein described or shown in the accompanying drawings is to be interpreted as illustrate and not in a limiting sense. Thus, it will be appreciated that these drawings are exemplary of a preferred embodiment of this invention.

What is claimed is:

1. A liquid crystal display projector with a lens protecting device capable of protecting and positioning lens, said liquid crystal display projector comprising:

a light source assembly for producing required light for operation of said liquid crystal display projector;

an image generating assembly for generating a projected image;

a power supply assembly for providing required power for any of said assembly;

a projection assembly for projecting said projected image onto a screen or a wall, said projection assembly comprising a first mirror and a lens that is used to adjust focal length of said liquid crystal display projector;

a lens protecting device assembly for protecting said lens to a protecting position and positioning said lens to a projecting position, said lens protecting device assembly comprising a cover, a second mirror, a plurality of springs, a top housing, an actuating device and a bottom housing, where said plurality of springs are used to connect said top housing and said bottom housing, said actuating device being connected to said cover and being used to change a position of said top housing according to a position of said cover; and a boxing assembly for boxing said light source assembly, said image generating assembly, said power supply assembly, said projection assembly and said lens protecting device assembly.

2. The liquid crystal display projector according to claim 1, further comprising a heat cooling assembly that is used to cool said image generating assembly.

3. The liquid crystal display projector according to claim 1, wherein said light source assembly comprises a light source, a reflector and a condenser, where said light source supplies light for operation of said liquid crystal display projector, and both said reflector and said condenser enhance intensity of said light.

4. The liquid crystal display projector according to claim 1, wherein said image generating assembly comprises a rear fresnel lens, a front fresnel lens, a polarizer, a liquid crystal panel and a liquid crystal panel controller.

5. The liquid crystal display projector according to claim 4, wherein said rear fresnel lens locates in a side of said image generating assembly that nearer to said light source assembly, and said front fresnel lens locates in another side of said image generating assembly, both said front fresnel lens and said rear fresnel lens being used to guide propagation of said light.

6. The liquid crystal display projector according to claim 4, wherein said liquid crystal panel controller is used to accept signal from an external machine and to control operation of said liquid crystal panel.

7. The liquid crystal display projector according to claim 6, wherein said external machine comprises computer.

8. The liquid crystal display projector according to claim 1, wherein said cover can be connected with said boxing assembly or said bottom housing by a hinge.

9. The liquid crystal display projector according to claim 1, wherein said second mirror is located in said cover, and said second mirror is used to adjust a projecting angle of said liquid crystal display projector.

10. The liquid crystal display projector according to claim 8, wherein the degree of an angle between said top housing and said cover is adjusted by rotating said cover around said hinge.

11. The liquid crystal display projector according to claim 1, wherein said lens is secured in said top housing and moves together with said top housing.

12. The liquid crystal display projector according to claim 1, wherein bottom of said top housing is transparent.

13. The liquid crystal display projector according to claim 1, wherein said bottom housing is totally secured inside said boxing assembly.

14. The liquid crystal display projector according to claim 1, wherein an end of each of said springs is secured in said top housing and another end of each of said springs is secured in said bottom housing.

15. The liquid crystal display projector according to claim 1, wherein said top housing does not be covered by said cover, said springs pushing both said lens and said top housing away said bottom housing and locating said lens in said projecting position.

16. The liquid crystal display projector according to claim 1, wherein said cover gradually covers said top housing, said actuating device gradually deforming said springs such that both said top housing and said lens are located into said boxing assembly until both said top housing and said lens are totally located inside said boxing assembly and said lens is located in said protecting position.

17. The liquid crystal display projector according to claim 1, wherein a distance between said protecting position and said projecting position depends on the optical quality of said liquid crystal display projector and is controlled by elastcity of said springs.

18. A lens protecting device capable of protecting and positioning a lens of a liquid crystal display projector, said lens protecting device comprises:

a cover, wherein a mirror locates on said cover;

a top housing, wherein said lens is secured inside said top housing and is moved together with said top housing;

a bottom housing, wherein said bottom housing connects with said cover by a plurality of hinges;

an actuating device, wherein said actuating device is connected to said cover and is used to change a position of said top housing in accordance with a position of said cover, such that a position of said lens and a distance between said top housing and said bottom housing is adjusted by a movement of said cover; and a plurality of springs, wherein said springs are used to connect said top housing and said bottom housing.

19. The lens protecting device according to claim 18, wherein both said cover and said mirror are used to change a projecting angle of said liquid crystal display projector.

20. The lens protecting device according to claim 18, wherein the degree of an angle between said top housing and said cover is adjusted by rotating said cover around said hinges.

21. The lens protecting device according to claim 18, wherein both bottom of said top housing and bottom of said bottom housing are transparent.

22. The lens protecting device according to claim 18, wherein said bottom housing is totally secured inside said liquid crystal display projector.

23. The lens protecting device according to claim 18, wherein an end of each of said springs is secured in said top housing and another end of each of said springs is secured in said bottom housing.

24. The liquid crystal display projector according to claim 18, wherein said top housing does not be covered by said cover, said springs pushing both said lens and said top housing away said bottom housing and locating said lens in said projecting position.

25. The liquid crystal display projector according to claim 18, wherein said cover gradually covers said top housing, said actuating device gradually deforming said springs such that both said top housing and said lens are located into said bottom housing.

26. The liquid crystal display projector according to claim 1, wherein said first mirror is located inside said boxing assembly.

* * * * *